United States Patent
Mattingly

[15] 3,678,311
[45] July 18, 1972

[54] ELECTRIC MOTOR
[72] Inventor: Frederick William Mattingly, Middlesex, England
[73] Assignee: Toolmasters Limited, Hillingdon Heath, Middlesex, England
[22] Filed: Jan. 25, 1971
[21] Appl. No.: 109,436

[52] U.S. Cl..............................................310/156, 310/164
[51] Int. Cl.......................................................H02k 21/12
[58] Field of Search...................310/156, 268, 164, 209, 103; 324/151

[56] References Cited
UNITED STATES PATENTS

3,181,020  4/1965  Welter...................................310/164
2,803,765  8/1957  Timmerman..........................310/156
3,304,449  2/1967  Pohlman et al........................310/103

*Primary Examiner*—D. X. Sliney
*Attorney*—Kemon, Palmer & Estabrook

[57] ABSTRACT

An electric motor comprising a rotor magnet of magnetically anisotropic material which has a plurality of regions each of which is magnetized in a preferred direction parallel to the axis of rotation of the rotor, alternate regions being magnetized in opposite directions so as to form north and south poles associated with a side of the rotor which faces pole pieces of a stator.

9 Claims, 4 Drawing Figures

PATENTED JUL 18 1972 3,678,311

Inventor:
FREDERICK W. MATTINGLY
By Kenyon, Palmer & Estabrook

ELECTRIC MOTOR

This invention relates to an electric motor.

It is generally agreed that a relatively inexpensive, silent, high torque electric motor would have many valuable applications for example in timing and control systems particularly for domestic installations where it is desirable to keep the cost and the noise level as low as possible. The noise from electric motors presently used in many such systems is partly dependent on the maintenance of a constant and symmetrical gap between a rotor and a stator. It is also partly dependent on the type and quality of the rotor bearings. Consequently, some components of the motor have had to be accurately machined and in some cases a final grinding operation has been necessary to bring the rotor to the exact dimensions required. Such precision is necessarily expensive.

According to this invention we provide an electric motor comprising a rotor magnet of magnetically anisotropic material which has a plurality of regions each of which is magnetized in a preferred direction parallel to the axis of rotation of the rotor; alternate regions being magnetized in opposite directions so as to form north and south poles associated with a side of the rotor which faces pole pieces of a stator.

Such a rotor is preferably carried on a shaft and is subject to a magnetic force urging it towards the stator. This results in the rotor being continually urged against a stop which engages the shaft to oppose the said force. In use, the presence of this force reduces chatter or play of the rotor shaft. The position of the stop is preferably adjustable, and the stop is preferably of low friction material.

Particular non-limitative examples of the invention will now be described with reference to the accompanying diagrammatic drawings in which.

Figure 3:
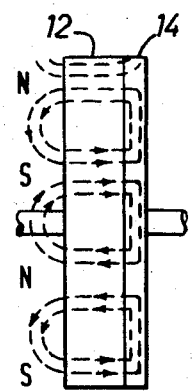
FIG. 3 illustrate the rotor as viewed from the right hand side of FIG. 2, and shows four of the sectors shown in FIG 2.
Figure 4:
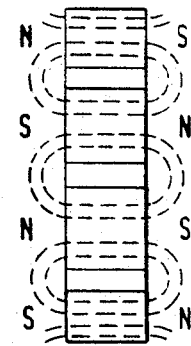
FIG. 4 illustrates a rotor of a two phase or stepper motor constituting a further embodiment of the invention.

In FIGS. 3 and 4, the broken lines represent lines of magnetic force, and magnetic north and south poles are signified by the letters N and S respectively.

Figure 1:
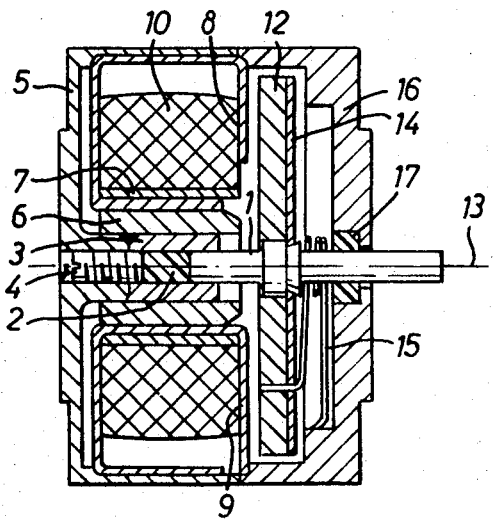
FIG. 1 illustrates an axial cross-section of a single phase synchronous motor embodying the invention.

In the single phase motor illustrated in FIG. 1, the rotor shaft 1 is located axially by a stop which consists of a slug 2 of low friction material housed in a bore of a metal bearing member 3. A setting screw 4 allows adjustment of the position of the slug in the bore. The bearing member 3 is located with respect to an external housing 5 by a soft iron sleeve 6. Soft iron strips are bent to form pole pieces of the stator and are located on the sleeve 6 by a larger concentric soft iron sleeve 7. Two pole pieces of opposite polarity are indicated in FIG. 1 by reference numerals 8 and 9. The soft iron strips toroidally encompass a winding 10 of the stator, which is symmetrically arranged about the axis of rotation of the rotor.

Figure 2:
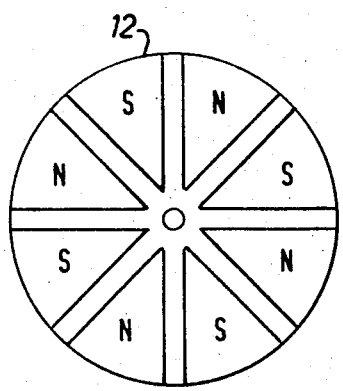
FIG. 2 illustrates a face view of a rotor of the motor shown in FIG. 1 and shows eight magnetic poles on eight respective sectors of the rotor.

When the winding 10 is fed with electric current and electromagnetic field is produced in an air gap 11 between the pole pieces and the rotor magnet 12. The rotor magnet is a disc of magnetically anisotropic material, e.g., barium, strontium or lead ferrites with the preferred direction of magnetization parallel to the axis 13 of the rotor and arranged to produce eight alternate poles of opposite polarity associated with the side of the magnet facing the pole pieces of the stator as shown in FIG. 2. The other side of the rotor magnet is secured to a steel disc 14 which provides a low reluctance path for magnetic flux. FIG. 3 shows four of the eight regions or sectors marked in FIG. 2 and it can be seen that alternate sectors are magnetized in opposite directions. A one way device 15 determines the direction of rotation of the rotor and the moving parts are covered by a cap 16 which has a second bearing 17 for the shaft 1.

A magnetic force is exerted on the rotor towards the stator whether the winding 10 is fed with current or not and the width of the air gap 11 is therefore dependent on the position of the slug 2. A locking device (not shown) can be provided to lock the slug in position after adjustment. The adjustable width of the air gap between rotor and stator enables motors to be constructed without using a grinding process to reduce the rotor magnet to the desired size. In the motor described above the rotor and pole pieces are completely unmachined; that is to say they have not been worked by any cutting or abrading tool. It has been found that the force which keeps the rotor shaft in contact with the slug 2 reduces or prevents rotor chatter or play, and that the noise of the motor in operation is virtually undetectable in a quiet room.

FIG. 4 illustrates a rotor for use in a two phase motor embodying the invention. In such a motor, a second winding would be placed on the other side of the rotor.

The single phase and two phase motors described above are only exemplary of many different possible embodiments of the invention. In other embodiments for example the rotor magnet could be magnetized to produce any number of poles within reason. Also it is possible to use a ball bearing in place of the slug 2 of low friction material.

What is claimed is:

1. An electric motor comprising a rotor having an axis of rotation and a stator, said stator having pole pieces and said rotor having a side which faces said pole pieces of said stator, said rotor having a rotor magnet of magnetically anisotropic material which has a plurality of regions each of which is magnetized in a direction parallel to the said axis of rotation of said rotor, alternate ones of said regions being magnetized in opposite directions so as to form north and south poles associated with said side of said rotor which faces said pole pieces of said stator.

2. A motor according to claim 1, in which said rotor has a rotor shaft and is subject to a magnetic force urging said rotor towards said stator, said motor further including a stop which engages said rotor shaft and opposes the said force.

3. A motor according to claim 2 including setting means which enables the position of said stop to be adjusted.

4. A motor according to claim 2 in which said stop is a slug of low friction material.

5. A motor according to claim 3 in which said stop is a slug of low friction material.

6. A motor according to claim 1 in which said anisotropic material is in the form of a disc, said regions being sectors of said disc.

7. A motor according to claim 6 in which said disc has a side facing away from said pole pieces of the said stator, said motor further including a ferrous metal plate which is secured to said side of said disc and which provides a low reluctance path for magnetic flux.

8. A motor according to claim 1 which operates as a synchronous motor.

9. A motor according to claim 1 in which said stator comprises a substantially toroidal winding symmetrically arranged about said axis of rotation of said rotor.

* * * * *